(12) United States Patent
Saxena

(10) Patent No.: US 6,370,132 B1
(45) Date of Patent: Apr. 9, 2002

(54) MOBILE TERMINATED CALL ROUTING IN A NETWORK ACCESS SERVER/ INTERWORKING FUNCTION

(75) Inventor: Narothum Saxena, Buffalo Grove, IL (US)

(73) Assignee: 3 Com Corporation, Santa Clara, CA (US)

( * ) Notice: Subject to any disclaimer, the term of this patent is extended or adjusted under 35 U.S.C. 154(b) by 0 days.

(21) Appl. No.: 09/223,625

(22) Filed: Dec. 29, 1998

(51) Int. Cl.[7] .............................. H04Q 7/24; H04J 3/24
(52) U.S. Cl. ..................... 370/338; 370/349; 375/222; 379/93.28; 379/931
(58) Field of Search ................................ 370/310, 338, 370/349, 401, 524, 352; 455/426, 445, 557; 375/220, 219, 222; 379/93.28

(56) References Cited

U.S. PATENT DOCUMENTS

| | | | |
|---|---|---|---|
| 5,315,635 A | * 5/1994 | Kan et al. ................... 455/31.2 |
| 5,528,595 A | 6/1996 | Walsh et al. ................. 370/402 |
| 5,577,105 A | 11/1996 | Baum et al. ............. 379/93.05 |
| 5,841,842 A | * 11/1998 | Baum et al. ............. 379/93.32 |
| 5,878,040 A | * 3/1999 | Peirce, Jr. et al. .......... 370/389 |
| 5,898,780 A | * 4/1999 | Liu et al. ....................... 380/25 |
| 5,905,781 A | * 5/1999 | McHale et al. .......... 379/93.14 |
| 5,983,282 A | * 11/1999 | Yucebay ..................... 709/249 |
| 6,061,347 A | * 5/2000 | Hollatz et al. .............. 370/352 |

OTHER PUBLICATIONS

Charles E. Perkins, Mobile IP Design Principles, Addison–Wesley Wireless Communications Series, (pp. 1–38) (1998).

* cited by examiner

*Primary Examiner*—Scema S. Rao
*Assistant Examiner*—Saba Tsegaye
(74) *Attorney, Agent, or Firm*—McDonnell Boehnen Hulbert & Berghoff

(57) ABSTRACT

Mobile terminated calls arriving at a network access server configured as an Interworking function (IWF) are routed to a particular modem in the network access server by means of a table maintained at the interface to a communications network receiving the call. The table maps called party numbers (or call reference values uniquely assigned to each call) to a particular modem channel number and slot number for a modem that has already been assigned to the call.

14 Claims, 5 Drawing Sheets

PRI ROUTING TABLE

| CALLED PARTY NO. | MODEM SLOT NO. | MODEM CHANNEL NO. |
|---|---|---|
| 847-262-5000 | 2 | 1 |
| 847-275-3121 | 2 | 4 |
| 847-542-8715 | 6 | 3 |
| 708-342-9617 | 5 | 2 |
| 312-912-0001 | 4 | 4 |
| 312-936-7134 | 1 | 2 |
| ... | ... | ... |

Normal Call Clearing (A call has dropped)
case 1: Clear from the switch to the pri case 2: clear from the modem

MOBILE TERMINATED CALL ROUTING IN A NETWORK ACCESS SERVER/ INTERWORKING FUNCTION

BACKGROUND OF THE INVENTION

A. Field of the Invention

This invention relates to call routing in a network access server. More particularly, it relates to a method by which a land-side originated call is routed to one of a plurality of modems in a network access server. The network access server provides an interface between a land-side multiplexed digital network (e.g., ISDN primary rate interface connected to the PSTN) and a wireless network (e.g., frame relay line in a wireless network that is used to connect the call with a mobile communications device, e.g., a laptop computer with a cellular telephone modem or cellular phone, via a mobile switching center and base station).

B. Description of Related Art

A network access server is an integrated communications device that is used to demultiplex channels of a multiplexed digital telephone line, perform signal conversions on data contained in the channels with a plurality of modems, one modem per channel, and route the data onto a second network via a gateway interface card or module. A representative network access server is described in the patent to Dale M. Walsh, U.S. Pat. No. 5,528,595, which is incorporated by reference herein. A network access server suitable for coupling a multiplexed frame relay line of a wireless network to a packet-switched IP or other network is described in the patent application of Yingchun Xu, Ser. No. 08/887,313, also incorporated by reference herein. Network access servers are also available from 3Com Corporation, i.e., the Total Control Enterprise Network Hub. Similar devices are available from other companies in the industry, including Lucent Technologies (successor to Livingston Enterprises), Ascend Communications, Multitech, and still other companies.

When a network access server is used as an InterWorking Function (IWF) unit to couple a wireless network to a public switched telephone network, problems can arise in routing a call through the network access server, particularly where a land-side call is placed to a mobile wireless device (a situation referred to herein as a "mobile terminated" call). A problem arises in that when the land-side telephone wishes to place a call to the mobile node, the call goes through the Public Switched Telephone Network (PSTN) to a mobile switching center which then pages the mobile node through the wireless network. Meanwhile, a connection over the wireless network to the network access server/IWF is initiated and the call is assigned to one of the modems in the IWF. When the land side part of the call comes into the IWF, the land-side network interface card or module may not be able to determine which port or modem in the IWF is holding on to the wireless side of the call. Unless the two halves of the call (PSTN to IWF, and Mobile to IWF) can be put together at a single modem in the IWF, they will not connect and the call will be dropped.

The present invention addresses this situation and provides a way to insure that mobile terminated calls are efficient and correctly routed in the IWF such that a single modem in the IWF is assigned to both halves of the call.

SUMMARY OF THE INVENTION

A method is provided of routing a call through a network access server having a plurality of modems, a first interface module connecting the network access server to a first network (e.g., PSTN) and a second interface module connecting the network access server to a second network (e.g., a wireless network). Each of the modems are associated with a modem channel in the network access server. The method comprises the step of transmitting information to the first interface module regarding the routing of calls from the second interface module to the individual modems. The first interface module uses this information to route a call received from the first network to one of the modems. For example, the first interface module connected to the PSTN network may maintain a table mapping the allocation of particular calls to modem channel numbers and modem slot numbers, (e.g. by called number or calling number, or both). The table entries are populated by information received from the modems which identify the modem by slot and channel numbers and information identifying the call (e.g., called telephone number or a unique call reference value). Thus, when the land side of the call comes in to the network access server at the first interface module, the interface module can look to the table to determine which modem channel number and slot number to assign to the call. Accordingly, a connection between an endpoint on the first network and an endpoint on the second network may be achieved and the call routed via the modem assigned to the call in an efficient manner.

In a preferred embodiment, the information received by the first interface module comprises (1) a called party number and (2) information identifying a modem in the plurality of modems, e.g., by slot number and channel number. A further possibility is that the information comprises a call reference value uniquely identifying the call and information identifying a modem in the plurality of modems.

In a preferred embodiment, the first interface module maintains a routing table storing called party numbers for a plurality of calls and that associates each of the called party numbers with a modem slot number and a modem channel number. Ideally, the table is continually updated as new calls come in, and calls are dropped. Then, whenever a new call comes to the first interface module (e.g., PSTN) the module can look to the routing table and correctly match up the call to a modem in the IWF, simply by looking at the called party number in the new call and using the routing table to determine which modem to send the call to.

In another aspect of the invention, an improvement to a network access server is provided. The network access server comprises a first interface module, a plurality of modems, a second interface module and a bus complex linking said first and second interface modules and said modems together. The improvement comprises the feature of implementing a table in the network access server that maps called party numbers to modem numbers in the network access server. The table is used to route a call received at the respective interface module to a modem designated to receive the call. Preferably, the table is maintained in the interface module that is the second interface to receive the call and needs to know where to route the call to a modem already assigned to the call.

Additional features of the invention will be more apparent from the following detailed description.

BRIEF DESCRIPTION OF THE DRAWINGS

In the following description, reference will be made to the appended drawings, where like reference numerals refer to like elements in the various figures, and wherein:

FIG. 4 is a call flow diagram between the frame relay interface to the gateway card, modem, and primary rate interface (PRI) in the InterWorking Function 16 of FIG. 2.

DETAILED DESCRIPTION OF THE PREFERRED AND ALTERNATIVE EMBODIMENTS OF THE INVENTION

Figure 1:
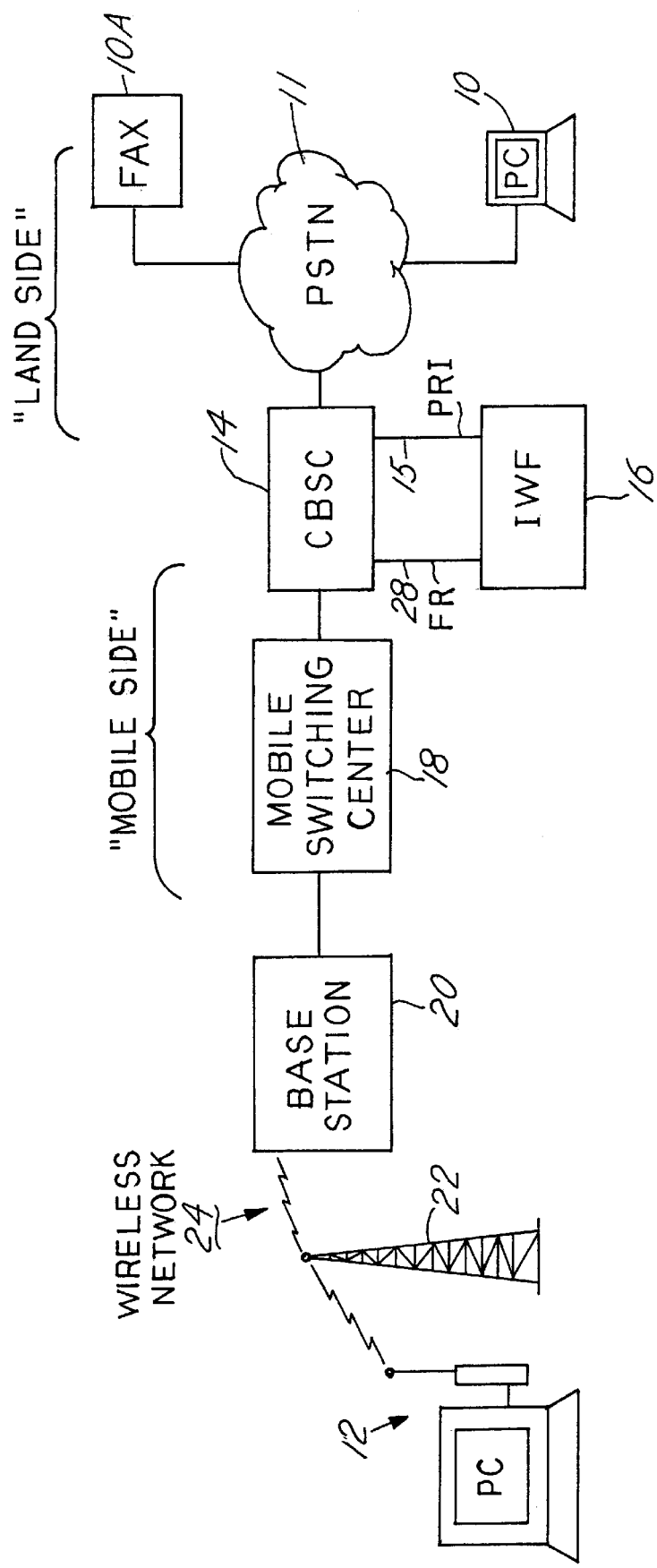
FIG. 1 is schematic diagram showing how a network access server configured as a wireless network InterWorking Function (IWF) may used to connect a wireless node (e.g., a CDMA cellular phone, laptop computer, etc.) to a telephone or data terminal in the public switched telephone network.

Referring now to FIG. 1, a representative environment in which the invention can be practiced is shown schematically. In FIG. 1, a land-side call originates from a data terminal or fax machine 10A that is destined for a mobile wireless node comprising a cellular phone, a wireless data terminal or a cellular fax machine 12. The data terminal 10 is connected to the PSTN 11 and the call is directed over the PSTN through a telephone company switch (not shown) to a Central Base Station Controller (CBSC) 14. The CBSC 14 is maintained and operated by the provider of the wireless communication service for the mobile node 12. The CBSC multiplexes a plurality of calls (e.g., 23) onto an Integrated Services Digital Network Primary Rate Interface (ISDN PRI) T1 line 15 and directs the calls, including the call from telephone 10, to a network access server (NAS) 16 functioning as an InterWorking Function or IWF. The CBSC also initiates a page of the mobile node 12 over the wireless network 24 using is a mobile switching center 18, base station 20 and tower 22 in order to get the mobile node 12 to receive the call.

When the wireless mobile node 12 dials into the wireless network 24, the call is relayed back through the base station 20 and CBSC, where the call is multiplexed on a frame relay line 28 and provided at a frame relay interface in the IWF/NAS 16. The problem is how to match up the land side of the call arriving from the data terminal 10A or 10 at the ISDN PRI interface in the IWF/NAS 16, with the mobile side of the call (typically arriving first) at the frame relay interface in the IWF/NAS 16.

Figure 2:
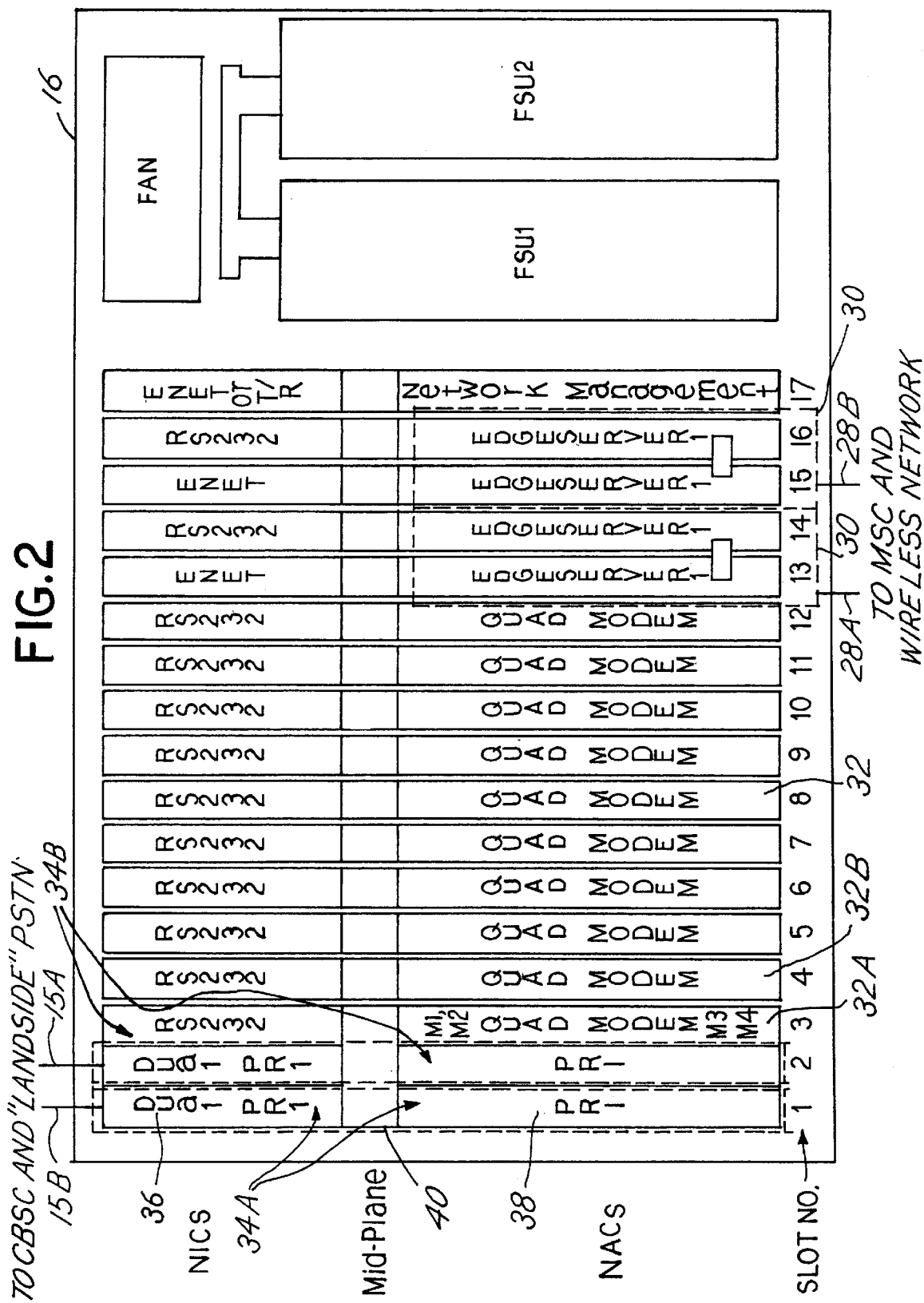
FIG. 2 is a block diagram of the network access server of FIG. 1.

A preferred IWF/NAS 16 of FIG. 1 is shown in more detail in block diagram form in FIG. 2. An exhaustive description of the basic architecture and operation of the NAS 16 is set forth in the patent literature, and therefore will be omitted from this document for the sake of brevity. See the patent to Dale M. Walsh, U.S. Pat. No. 5,528,595, the patent to Marc S. Baum et al., U.S. Pat. No. 5,577,105; the patent to Russell Panzarella et al., U.S. Pat. No. 5,416,76, the patent to Christopher Rozman et al., U.S. Pat. No. 5,438,614, and the above-cited patent application of Ying-chun Xu. See also the patent application of William Verthein et al., Ser. No. 08/813,173, describing a gateway card or module for the device which a incorporates general purpose computing platform. Each of the above patent documents is fully incorporated by reference herein.

Basically, the network access server/IWF 16 has the following functional components: a At gateway module 30 (two in the embodiment of FIG. 2), comprising, among other things, a general purpose computing platform and an interface to the Frame Relay line 28 and wireless network, a plurality of modem cards 32, each modem containing a number of modems (e.g., four modems per card, M1, M2, M3 and M4 in card 32A), and an ISDN PRI interface 34 (two in the embodiment of FIG. 2), including a network interface card (NIC) 36 which is connected to the ISDN PRI line 15 and an associated ISDN PRI network application card (NAC) 38. The IWF 16 further includes a midplane 40 bus complex that allows the various modules to communicate with one another. The bus complex 40 includes a time division multiplexed bus by which time slot channel data in the ISDN PRI T1 lines 15A and 15B is directed to the modems in the modem cards 32. The midplane bus 40 further includes a packet bus that links the modems in the modem cards 32 to the gateway card or module 30 and the modem cards 32 to the PRI cards 34. Messages, described below, between the gateway card or module 30, modem and the ISDN PRI module 34 are transmitted over the packet bus in the midplane 40. The chassis of the IWF 16 further includes power supply units and network management cards, but they are not germane to the present invention and further discussion thereof will therefore be omitted.

When the gateway module or interface 30 receives a call from the mobile side (i.e., wireless network 24), it answers that call and "seizes" one of the modems in the modem cards 32. When the gateway 30 answers the call, it extracts from the call a called party telephone number from the data stream. During the process of seizing the modem, the gateway 30 provides this called party telephone number to the modem in the modem module 32 that it seized and instructs the modem to match the called party telephone number which it would receive from the PRI interface 34 on an incoming land-side call to be paired with the call from the mobile side.

When the land-side call comes in from the PRI interface 34, the PRI card 34 will answer the call. A CALL_PROCEEDING message is send from the PRI card 34 to the switch (not shown) in the PSTN. The PRI card 34 will also send a message to the modem in the card 32 including the called party number. If the modem matches the number in the message from the PRI, the modem issues a message to accept the call to the PRI card and the PRI card 34 issues the CALL_PROCEEDING message to the switch. The switch sends a CONNECT_ACK acknowledgment message back to the PRI card, and the modem starts to train.

Problems can arise in routing the call to the proper modem if two mobile-terminated calls arrive at the PRI interface 34 at almost the same time. For example the PRI interface 34 will attempt to route the call to the modem designated or seized to handle the call but may get modem-allocated messages from the modems and be unable to route the call to any of the modems. After modem-allocated messages have been received from all the available modems, the PRI interface 34 would send a disconnect message to the switch and the call would be dropped if the techniques of the present invention were not employed.. This problem is attributable to the fact that, in the prior art, the PRI interface module 34 has no knowledge of the information of how the gateway card 30 has been assigning calls to the modems, for example the slot number (i.e., which modem card or slot in the chassis), channel number (i.e., which modem channel in the card), and the called party number.

The above situation is remedied by transmitting information from the modems to the PRI interface modules 34A and 34B regarding the routing of calls received from the wireless network through the gateway module 30 to the modems in the modem cards 32. The PRI interface modules 34A and 34B use that information to route a call to the proper modem in the chassis 16. Thus, a connection between the endpoint 10 on the PSTN network and an endpoint 12 the wireless network may be achieved in an efficient manner. Further, the invention avoids a it call being dropped due to an inability for the PRI interface module 34 to find the modem that has been assigned the call.

In a preferred embodiment, the information that is supplied to the PRI interface module 34 comprises a called party number associated with the call assigned to one of the modems, and information uniquely identifying the address of the modems in the chassis as the particular modem for that call. The information may, for example, comprise the slot number (i.e., card number) and channel number for the modem. Or, the information may comprise a call reference value uniquely identifying the call and identifying a modem in the plurality of modems that has been assigned the call.

The information that the PRI interface 34 uses is preferably saved in a table maintained at the PRI interface module 34. Preferably the PRI interface module maintains a routing table storing called party numbers for a plurality of calls and associating each of the called party numbers with a modem slot number and a modem channel number.

Figure 3:
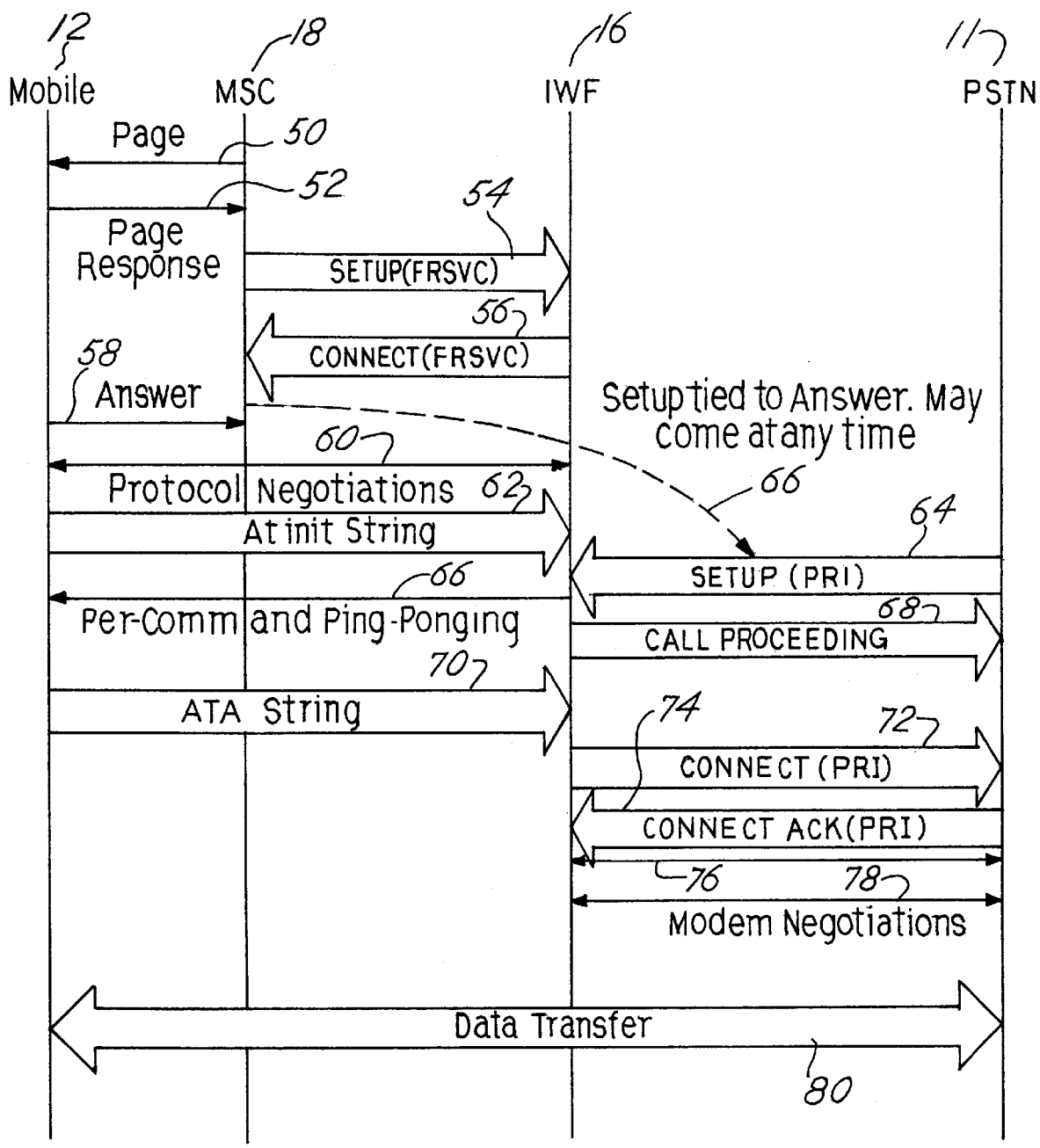
FIG. 3 is a call flow diagram showing the flow of messages and control characters, and in-band communication, between a mobile unit, mobile switching center, InterWorking Function or network access server, and PSTN elements of FIG. 1, for a land-side originated, mobile terminated call.

Referring now to FIG. 3, the flow of messages and character commands and in-band communications between the various entities for a mobile terminated call is illustrated for the basic architecture of FIG. 1. When the telephone company central office detects a PSTN call to a mobile subscriber, the telephone company central office switch in PSTN 12 will "park" the call, and the IWF 16 is not yet involved. The mobile switching center 18 pages the mobile node 12, as indicated at 50. The mobile then answers the page, as indicated at 52. Then, at 54, the mobile side establishes a frame relay switched virtual circuit connection with the IWF. This is achieved by transmission of SETUP message between the mobile switching center (MSC) in the wireless network and the gateway card 30 of the IWF 16. After receiving the SETUP message, the IWF responds to the MSC with a CONNECT message, as indicated at 56.

The mobile 12 then issues an in-band answer command at 58 and establishes a TCP/IP/PPP connection and starts the protocol negotiations at 60. At 62, the mobile sends AT initialization commands to the IWF 16. The IWF 16 and mobile node 12 then ping-pong the commands and acknowledgements back and forth, as indicated at 66.

Part of the switched virtual circuit set-up information contained at 54 is information identifying whether the call is mobile originated or mobile terminated. In the case that the set up information at 54 is mobile terminated, the IWF does not initiate an ISDN PRI connection on the land-side to seek out the land-side half of the call. Rather, as noted above, the telephone company central office has "parked" the call, and so the IWF 16 waits until it receives a PSTN SETUP message at the PRI interface 34 (FIG. 2), as indicated at 64 in FIG. 3. The SETUP message at 64 includes information identifying both the called number and the calling number. This call is tied to the mobile answer (as indicated at 66), and is not tied to any protocol negotiations. Thus, it is possible for the IWF to see the PSTN connection before it has completed or even started its protocol negotiations with the mobile node (at 60).

In response to the SETUP message at the PRI, the IWF issues a call proceeding message to the PSTN switch at 68. During this time, the IWF will check to see if it has a corresponding frame relay switched virtual circuit mobile-terminated call for which the called number (phone number of telephone 10, FIG. 1) is equal to the called number from the PRI. This process is described in more detail herein.

When the call is ready to be answered or actually answered by the IWF, the CBSC 14 (FIG. 1) will send an ATA command string to the IWF, as indicated at 70.

When the IWF matches the land side and mobile side calls, it will respond with a connect message 72 to the PSTN. A connect acknowledgement is received from the PSTN at 74. Modem training and modem protocol negotiations as performed indicated at 76 and 78. After the modem negotiations are complete, data transfer between the mobile node 12 and the data terminal 10 in the PSTN occurs, as indicated at 80.

Referring now to FIGS. 2 and 4, the internal message flow in the NAS/IWF 16 to help the PRI interface 34 correctly route the land-side call to the proper modem will be described. When an incoming call (mobile terminated) arrives at the gateway card 30 from the wireless network, the gateway module 30 sends out a PAP_SEIZE message on the packet bus in the midplane 40 (FIG. 2) to a modem in one of the modem cards 32. The PAP_SEIZE message must have the called party number (i.e., the number of the land-side telephone) and a call reference value, which is a unique number for each call. The modem then sends a message to the PRI interface 34 (USR_ROUTE_CALL) telling it that it has that particular call. The message USR_ROUTE_CALL would contain, for example, the call reference value, the called party telephone number, the modem slot number and channel number, and perhaps additional information. The PRI sends an acknowledgement (USR_ROUTE_CALL_ACK) back to the modem indicating receipt of the USR_ROUTE_CALL message.

Figure 5:
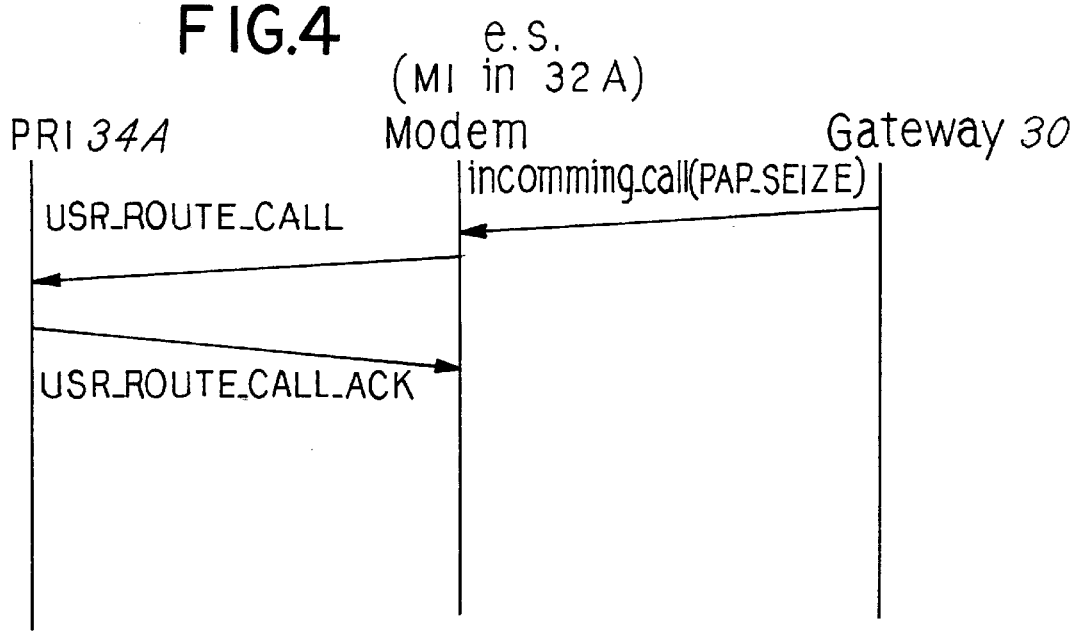
FIG. 5 is an illustration of a PRI routing table maintained in the card providing the PRI interface in the InterWorking Function of FIG. 2.

The PRI interface 34 maintains a table that stores the called party number, modem slot number, and modem channel number. An example of such a table is illustrated in FIG. 5. When the PRI interface 34 receives the land side of the mobile-terminated call (i.e., at 64 in FIG. 3), it will try to match the calling party number on the land side with the called party number received from the modem in the routing table of FIG. 5. When it finds a match, the PRI will route the call to that particular modem. More specifically, since it knows the modem slot number and modem channel number, and since each modem slot and channel number has a unique time slot in the time division multiplexed bus in the midplane 40, the PRI interface 34 can direct the call to that specific modem by virtue of a switch in the PRI NAC card 34A of FIG. 2.

It would also be possible to route the calls to the proper modem based on the call reference value rather than by called party number. The left-hand column of table in FIG. 5 would simply replace the called party number with the call reference value. Or, alternatively, both the called party number and the call reference value could be used together to correctly route the call to the proper modem.

Figure 6:
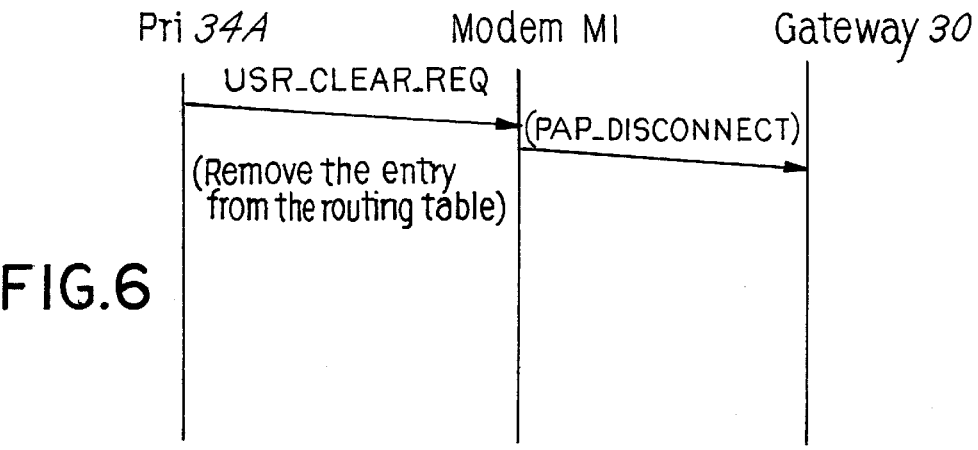
FIG. 6 is an illustration the flow of internal messages in the Interworking Function of FIG. 2 in the case of a call clearing from the PSTN side.

When a call is cleared from the IWF, the entries in the table of FIG. 5 should be updated. Referring now to FIG. 6, in the case of a call clearing being initiated from the Telephone Company Central Office (TELCO) switch in the PSTN, the PRI interface 34A will receive a call clearing message, remove the entry for that call in the routing table of FIG. 5, and then send a clear request message to the modem M1. The modem will send a disconnect message to the gateway (PAP_DISCONNECT), and the gateway interface 30 will clear its connection for that call on the wireless network.

Figure 7:
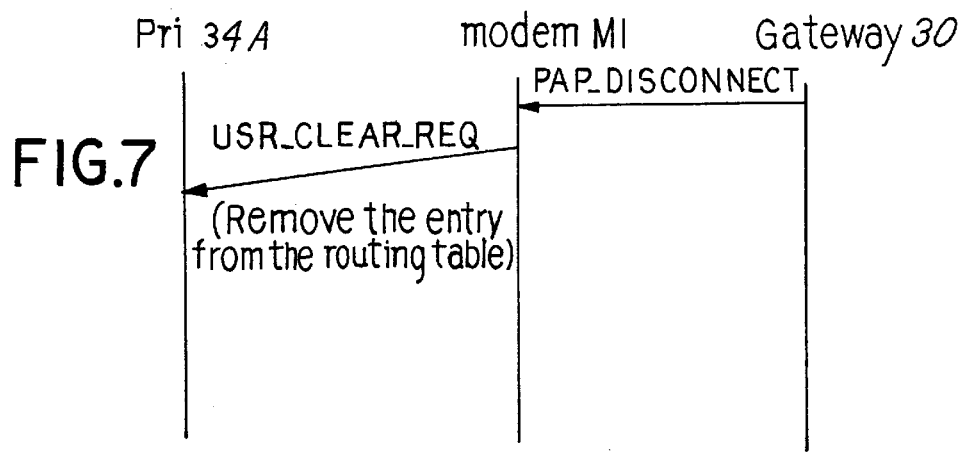
FIG. 7 is an illustration of the flow of internal message in the case of a call clearing from the mobile side.

In the event that the clearing is initiated from the wireless network, as shown in FIG. 7 the gateway 30 sends a disconnect message to the modem (PA_DISCONNECT), and the modem responsively issues a clear request message to the PRI interface 34A (USR_CLEAR_REQ). The PRI then removes the entry in the routing table associated with the modem that sent the clear request message.

Figure 8:
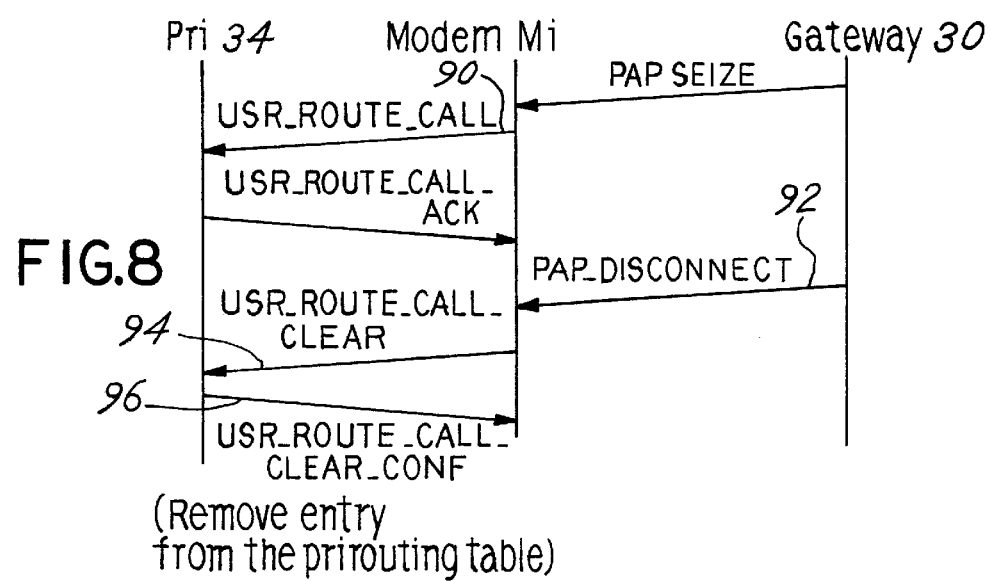
FIG. 8 is an illustration of the flow of internal messages when the mobile node drops the call even before the land-side call is made.

In the event that the gateway interface 30 receives a call but then the mobile unit 12 decides to drop the call even before the land-side of call is made, the flow of messages shown in FIG. 8 is performed. In this case, the modem would have sent out a USR_ROUTE_CALL message 90 to the PRI, which would initiate an entry in the routing table at the PRI 34A. When the modem receives the disconnect message 92 from the gateway, it must send a USR_ROUTE_CLEAR message 94 to the PRI 34 in order to have the PRI remove the entry from the routing table. The PRI then issues a confirmation message 96 to the modem. The basic idea of FIG. 8 is that the PRI routing table of FIG. 5 has to be maintained dynamically on a per call basis.

The above representative embodiment is intended to illustrate but one example of how call routing information can be shared in a network access server in order to match up and efficiently route calls through the device. The basic idea is that when one half of the call comes into the network access server and that call is assigned to one of the modems, the other interface that will receive the other half of the call must be provided with information in order to intelligently and quickly route the call to the particular modem. Persons skilled in the art will appreciate that considerable departure and variation from the specifics of the disclosed embodiment can be made to achieve this result, without departure from the true scope and spirit of the invention. This true scope and spirit is to be defined by the appended claims, interpreted in light of the foregoing.

Furthermore, the term "modem" in meant to be interpreted broadly to encompass traditional modems (modulator/demodulator devices), digital modems, and modem "emulators", i.e., devices that perform signal conversions or other processes or otherwise respond to or process commands typically processed in modems.

I claim:

1. A method of routing a call through a network access server having a plurality of modems, a first interface module connecting said network access server to a first land-based network and a second interface module connecting said network access server to a second, wireless network, each of said modems associated with a modem channel in said network access server, comprising the steps of:

transmitting information from said modems to said first interface module regarding the assignment of calls received from said second, wireless network to said modems;

implementing a table in said first interface module mapping called party numbers to said information regarding the modem assignment of calls received from said second, wireless network;

said first interface module using said information from said table to route a call received from said first network to one of said modems, whereby a connection between an endpoint on said first network and an endpoint on said second, wireless network may be routed via said modem assigned to said call in an efficient manner.

2. The method of claim 1, wherein said information comprises a called party number and information identifying a modem in said plurality of modems.

3. The method of claim 1, wherein said information comprises a call reference value uniquely identifying said call and information identifying a modem in said plurality of modems.

4. The method of claim 2, wherein said information identifying a modem in said plurality of modems comprises a modem channel number and a modem slot number.

5. The method of claim 3, wherein said information identifying a modem in said plurality of modems comprises a modem channel number and a modem slot number.

6. The method of claim 1, wherein said first interface maintains a routing table storing called party numbers for a plurality of calls and associating each of said called party numbers with a modem slot number and a modem channel number.

7. The method of claim 1, wherein said first interface module comprises an ISDN PRI interface card.

8. The method of claim 1, wherein said method is performed in a network access server coupling a mobile communications network to a public switched telephone network.

9. In a communications device comprising a plurality of modems and an interface module providing an interface between a wireless network and a land-based communications network, the improvement comprising:

implementing a table in said interface module mapping called party numbers to modem address information in said device, said modem address information corresponding to modem assignments for modems assigned to one half of a call being routed through said device; and using said table to route a call received at said interface module from said land-based communications network to a modem amongst said plurality of modems, wherein said modem is designated to be assigned to said call according to said table and said modem address information.

10. The improvement of claim 9, wherein said table is maintained in an ISDN PRI interface card.

11. The improvement of claim 9, wherein said modem numbers comprise a modem slot number and a modem channel number.

12. The method of claim 1, wherein said information is transmitted from one of said modems to said second interface module.

13. The improvement of claim 9, wherein said table is populated from information transmitted from said modems to said interface module.

14. The improvement of claim 9, wherein said communications network comprises a public switched telephone network and said communications device further comprises a gateway module providing an interface to a wireless communications network.

* * * * *